(12) United States Patent
Velciu et al.

(10) Patent No.: US 11,855,902 B2
(45) Date of Patent: Dec. 26, 2023

(54) DEVICE AND METHOD FOR SPLITTING DATA FOR TRANSMISSION

(71) Applicant: NXP USA, Inc., Austin, TX (US)

(72) Inventors: Veronica Mihaela Velciu, Bucharest (RO); Christian Herber, Hamburg (DE)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 17/662,323

(22) Filed: May 6, 2022

(65) Prior Publication Data

US 2023/0254261 A1  Aug. 10, 2023

(30) Foreign Application Priority Data

Feb. 10, 2022  (RO) ............................... a 202200067

(51) Int. Cl.
    *H04L 47/36*  (2022.01)
    *H04L 67/06*  (2022.01)
    *H04L 49/00*  (2022.01)

(52) U.S. Cl.
    CPC .............. *H04L 47/36* (2013.01); *H04L 67/06* (2013.01); *H04L 49/3072* (2013.01)

(58) Field of Classification Search
    CPC ..... H04L 41/122; H04L 41/14; H04L 41/342; H04L 47/722; H04L 47/36; H04L 67/06; H04L 49/3072; G06F 16/20
    See application file for complete search history.

(56) References Cited

U.S. PATENT DOCUMENTS

2013/0013731 A1*  1/2013  Ree ..................... H04L 67/125
                                                      709/217
2022/0103185 A1*  3/2022  Connor ............... H03M 13/251

OTHER PUBLICATIONS

Shelby, Z. et al. "The Constrained Application Protocol (CoAP)" draft-ietf-core-coap-03, Internet Engineering Task Force (IETF), Oct. 2010, p. 1-39 (Year: 2010).*
Scott, M. et al. "YANG Module for NETCONF Monitoring" RFC6022, Internet Engineering Task Force (IETF), Oct. 2010, p. 1-28 (Year: 2010).*
Bjorklund, M. et al. "YaNG A Data Modeling Language for the Network Configuration Protocol (NETCONF)" RFC6020, Internet Engineering Task Force (IETF), Oct. 2010, p. 1-173 (Year: 2010).*
Bormann, C. et al. "Block-Wise Transfers in the Constrained Application Protocol (CoAP)", Internet Engineering Task Force (IETF), Request for Comments: 7959, 37 pgs., Aug. 2016.
Shelby, Z. et al. "The Constrained Application Protocol (CoAP)", Internet Engineering Task Force (IETF), Request for Comments: 7252, 112 pgs., Jun. 2014.
Veillette, Michel et al. "CoAP Management Interface (CORECONF)", 2 pgs., last updated Jul. 26, 2021.

* cited by examiner

*Primary Examiner* — Tonia L Dollinger
*Assistant Examiner* — Joseph M Cousins (57) ABSTRACT

Embodiments of a device and a method for providing data are disclosed. In an embodiment, a device includes a processing system configured to split data of a request into messages by splitting the data based on a node of the data, where the messages fit a supported size, and provide the messages that include the data of the request to a communications interface.

18 Claims, 11 Drawing Sheets

```
1756 : [
    {
        3 : "NRC TIC server",         / server (SID 1756) /
        5 : {                          / name (SID 1759) /
            1 : "tic.nrc.ca",          / udp (SID 1761) /
            2 : 123                    / address (SID 1762) /
        },                             / port (SID 1763) /
        1 : 0,                         / association-type (SID 1757) /
        2 : false,                     / iburst (SID 1758) /
        4 : true                       / prefer (SID 1760) /
    },
    {
        3 : "NRC TAC server",          / name (SID 1759) /
        5 : {                          / udp (SID 1761) /
            1 : "tac.nrc.ca",          / address (SID 1762) /
        }
    }
]
                                              LIST 208
```

```
1752 : "myhost.example.com"      / hostname (SID 1752) /
                        LEAF 202
```

```
1746 : [ "ietf.org", "ieee.org" ]    / search (SID 1746) /
                        LEAF-LIST 204
```

```
1720 : {                          / system-state (SID 1720) /
    1 : {                         / clock (SID 1721) /
    2 : "2015-10-02T14:47:24z-05:00",  / current-datetime (SID 1723) /
    1 : "2015-09-15T09:12:58z-05:00"}  / boot-datetime (SID 1722) /
}
                        CONTAINER 206
```

DEVICE AND METHOD FOR SPLITTING DATA FOR TRANSMISSION

CROSS-REFERENCE TO RELATED APPLICATIONS

This application claims the priority under 35 U.S.C. § 119 of Romanian Patent application no. A202200067, filed on 10 Feb. 2022, the contents of which are incorporated by reference herein.

BACKGROUND

In client-server communications, devices, e.g., a client and a server, can exchange large amounts of data using Software-Defined Networking (SDN) transfers when working with larger lookup tables. As an example, when a client has a request that is larger than the server supports, the client may transfer the large request to the server via a block-wise transfer that involves splitting the large request into multiple messages that each include blocks of data from the large request. However, such transfers typically require the server to have a sufficiently large buffer in its memory in order to reassemble the messages and process the large request. As such, the efficiency of client-server communications may be constrained by the size of server buffers.

SUMMARY

Embodiments of a device and a method for providing data are disclosed. In an embodiment, a device includes a processing system configured to split data of a request into messages by splitting the data based on a node of the data, where the messages fit a supported size, and provide the messages that include the data of the request to a communications interface.

In an embodiment, the processing system is configured to split the data in response to the device receiving a response message that indicates a maximum supported size.

In an embodiment, the processing system is configured to split the data by entering the node of the data to obtain a node type, and splitting the node of the data according to the node type.

In an embodiment, the node type is a leaf, and where the processing system is configured to split the data according to the node type by determining that a value of the leaf fits the supported size, and including the value in one of the messages.

In an embodiment, the node type is a leaf, and where the processing system is configured to split the data according to the node type by determining that a value of the leaf does not fit the supported size, and providing the value via a block-wise transfer.

In an embodiment, the node type is a leaf-list, and where the processing system is configured to split the data according to the node type by obtaining an element of the leaf-list, determining whether the element fits the supported size, extracting an element index (index) from the element, and including the element in one of the messages, where the index is used in a request Uniform Resource Identifier (URI).

In an embodiment, the node type is a list, and where the processing system is configured to split the data according to the node type by obtaining an instance of the list, determining whether the instance fits the supported size, extracting a key instance (instKey) from the instance, and including the instance in one of the messages, where the instKey is used in a request URI.

In an embodiment, determining whether the instance fits the supported size includes determining that the instance fits the supported size, encoding the instance in a buffer of one of the messages with a Schema Item iDentifier (SID) of the node and the instKey of the instance, and obtaining a next instance of the list.

In an embodiment, determining whether the instance fits the supported size includes determining that the instance does not fit the supported size and that a buffer prepared for sending is not empty, sending the buffer prepared for sending in one of the messages, where the instance is excluded from the message that includes the buffer prepared for sending, encoding the instance in an empty buffer of another one of the messages with an SID of the node and the instKey of the instance, and obtaining a next instance of the list.

In an embodiment, determining whether the instance fits the supported size includes determining that the instance does not fit the supported size and that a buffer prepared for sending is empty, and returning to the step of entering the node of the data to further split the instance.

In an embodiment, the node type is a list, and where the processing system is configured to split the data according to the node type by obtaining an instance of the list that is null (null instance), determining that a buffer prepared for sending is not empty, and sending the buffer prepared for sending in one of the messages.

In an embodiment, the node type is a container, and where the processing system is configured to split the data according to the node type by obtaining a sub-node of the container, determining whether the sub-node fits the supported size, extracting a sub-node SID (sub-SID) from the sub-node, and including the sub-node in one of the messages, where the sub-SID is used in a request URI.

In an embodiment, determining whether the sub-node fits the supported size includes determining that the sub-node fits the supported size, encoding the sub-node in a buffer of one of the messages with an SID of the sub-node, and obtaining a next sub-node of the container.

In an embodiment, determining whether the sub-node fits the supported size includes determining that the sub-node does not fit the supported size and that a buffer prepared for sending is not empty, sending the buffer prepared for sending in one of the messages, where the sub-node is excluded from the message that includes the buffer prepared for sending, encoding the sub-node in an empty buffer of another one of the messages with an SID of the sub-node, and obtaining a next sub-node of the container.

In an embodiment, determining whether the sub-node fits the supported size includes determining that the sub-node does not fit the supported size and that a buffer prepared for sending is empty, and returning to the step of entering the node of the data to further split the sub-node.

In an embodiment, the node type is a container, and where the processing system is configured to split the data according to the node type by obtaining a sub-node of the container that is null (null sub-node), determining that a buffer prepared for sending is not empty, and sending the buffer prepared for sending in one of the messages.

In an embodiment, the splitting includes splitting the node of the data to obtain a child node, determining that the child node fits the supported size, and including the child node in one of the messages.

In an embodiment, the splitting includes splitting the node of the data to obtain a child node, determining that the child node does not fit the supported size, and splitting the child node.

A method for providing data is also disclosed. The method includes splitting, by a device, data of a request into messages by splitting the data based on a node of the data, where the messages fit a supported size, and providing, by the device, the messages that include the data to a communications interface.

In an embodiment, splitting the data includes entering the node of the data to obtain a node type, and splitting the node of the data according to the node type.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In a client-server communication, a client (sometimes referred to herein as a "client device" or a "device") and a server (sometimes referred to herein as a "host") exchange data via a computer network according to an internet application protocol. As an example, the client may be a device such as a laptop, a desktop personal computer (PC), a mobile phone, or other communications device that connects to and uses resources from the server. The server may be a computer system that is configured to provide resources such as, for example, data, internet, and/or external processing power to one or more clients. In some embodiments, the client and/or the server may be a constrained device, or may communicate via a constrained network. In such an embodiment, the constrained device(s) may operate according to a Constrained Application Protocol (CoAP). CoAP may be defined as a service layer protocol that is to be used by constrained devices or devices operating in constrained networks, and is designed to interface with Hypertext Transfer Protocol (HTTP) for web integration while also providing multicast support, low overhead, and simplicity for constrained communications. Additionally, CoAP can be used in various applications, such as industrial applications, automotive applications, medical applications, computer applications, and/or consumer or enterprise applications.

When a client is operating according to CoAP and sends a request that includes a large payload (e.g., when sending a large number of configurations to a device), the exchange may be handled according to conventional techniques as specified by RFC7959. According to RFC7959, the specification extends basic CoAP with a pair of block options for transferring the large payload of the request (or a large payload of a response) via multiple messages that include blocks of data from the large payload. The block options for transferring large payloads may be defined as "block-wise transfers". Block-wise transfers are typically used because the server does not have a large enough buffer in its memory and therefore is unable to process the large request using only one message. In one embodiment, a conventional block-wise transfer involves the server reassembling and processing the messages that include the large payload of the request after all the messages of the request are received. In another embodiment, the conventional block-wise transfer involves the server processing the messages that include the large payload of the request as the messages are received, however, such processing may only be used for certain types of data (e.g., when a large number of bytes need to be stored at the server). Examples of conventional block-wise transfers between a client and a server are described in further detail with reference to FIG. 1A and FIG. 1B.

Figure 1A:
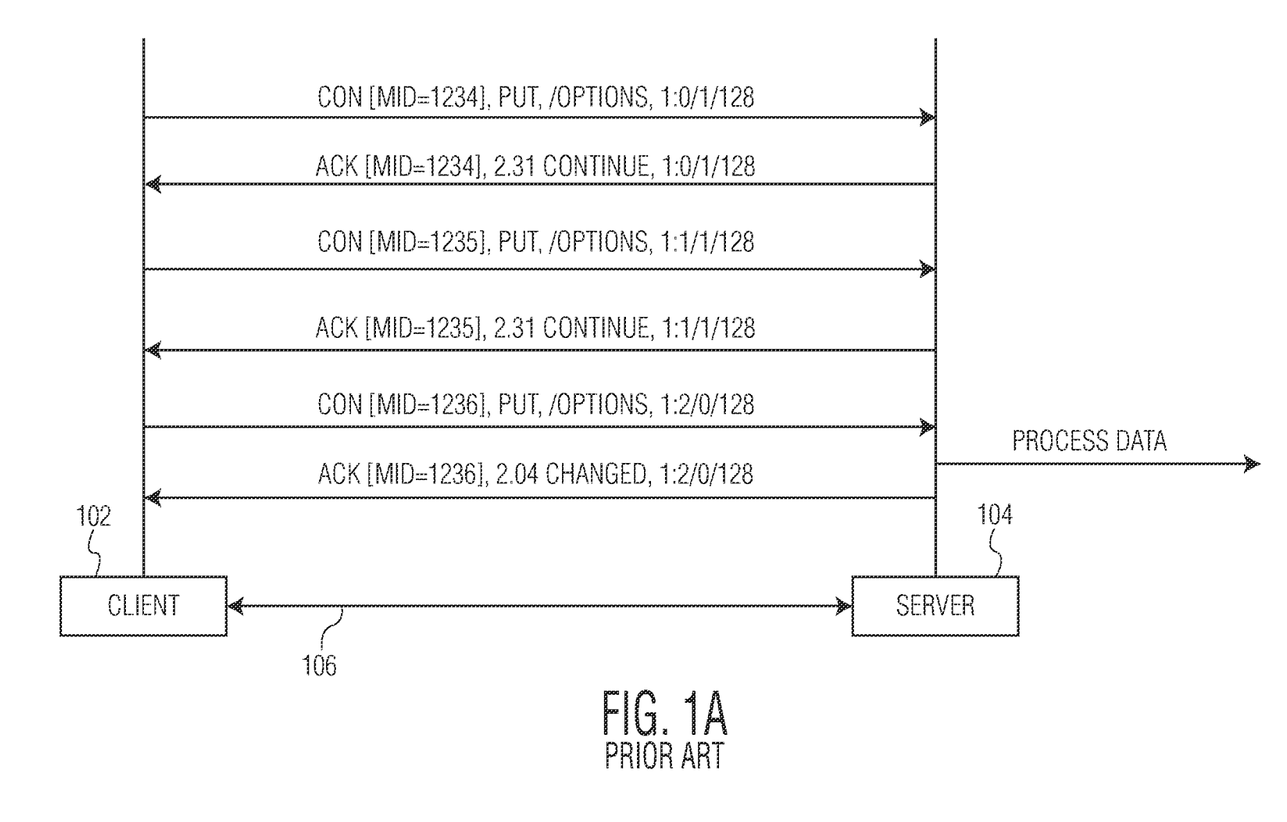
FIG. 1A illustrates an example of a conventional block-wise transfer between a client and a server.

FIG. 1A illustrates an example of a conventional block-wise transfer between a client 102 and a server 104. The conventional block-wise transfer shown in FIG. 1A may be a simple atomic block-wise PUT transfer. In the embodiment of FIG. 1A, the client 102 and the server 104 communicate via a communications channel 106. As an example, the server 104 is a constrained device and does not have a large buffer in its memory (not shown). The client 102 is therefore configured to transfer large payloads of a request (e.g., PUT request or POST request) via multiple messages that are provided to the server 104, such that the server 104 is configured to reassemble and process the messages received from the client 102 after all of the messages have been received. As described herein, "providing messages" may be described as transferring messages, transmitting messages, and/or sending messages. As an example, "providing messages" may involve a client providing messages to a communications interface that transfers the messages to a server via the communications channel 106. In an embodiment, the messages include blocks of data from the large payload of the request. As an example, each message may include its current block number (NUM), its size (SZX), and whether more blocks of data (e.g., more messages) are to follow.

The conventional block-wise transfer begins when the client 102 sends a first message (shown by "CON [MID=1234], PUT, /options, 1:0/1/128") that includes a first block of data (not shown), such that "CON [MID=1234]" represents a confirmation message, "PUT" represents a PUT request, "/options" represents a Uniform Resource Identifier (URI) of a resource to be updated, and "1:0/1/128" represents that the message is the first message, more messages are to follow, and that the first message is 128 bytes. In response to receiving the first message, the server 104 sends a first response message (shown by "ACK [MID=1234], 2.31 Continue, 1:0/1/128"), such that "ACK [MID=1234]" represents that the first response message is an acknowledgement message, "2.31 Continue" represents an indication to continue sending messages, and "1:0/1/128" represents details acknowledged by the first response message.

After receiving the first response message, the client 102 sends a second message (shown by "CON [MID=1235], PUT, /options, 1:1/1/128") that includes a second block of data (not shown). In response to receiving the second message, the server 104 sends a second response message (shown by "ACK [MID=1235], 2.31 Continue, 1:1/1/128"). After receiving the second response message, the client 102 sends a third message (shown by "CON [MID=1236], PUT, /options, 1:2/0/128") that includes a third block of data (not shown) and indicates that the client 102 has finished sending messages of the request. In response to receiving the third message, the server 104 begins to process the first, second, and third blocks of data (shown by "process data") included in the messages. After processing the data, the server 104 sends a third response message (shown by "ACK [MID=1236], 2.04 Changed, 1:2/0/128") that indicates that data in the server 104 has been changed in response to the messages of the request.

Figure 1B:
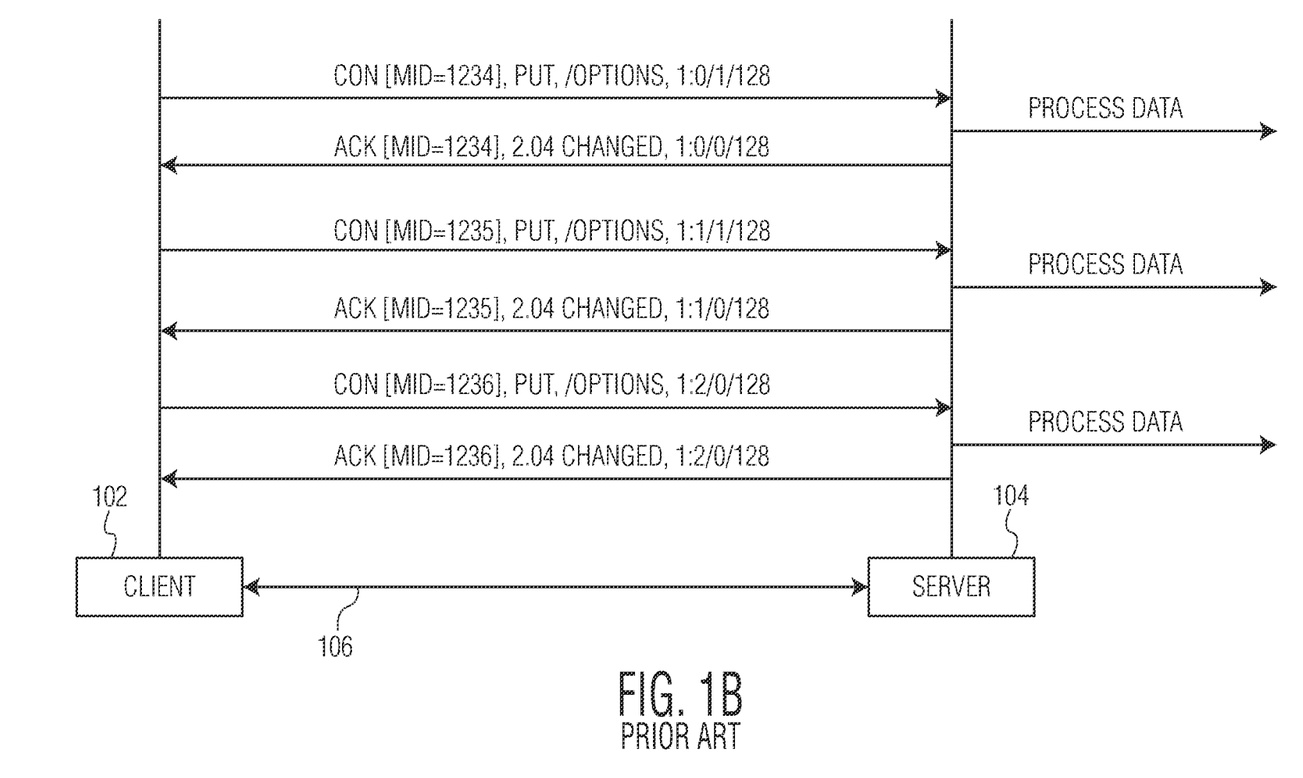
FIG. 1B illustrates another example of a conventional block-wise transfer between a client and a server.

FIG. 1B illustrates another example of a conventional block-wise transfer between a client 102 and a server 104. The conventional block-wise transfer shown in FIG. 1B may be a simple stateless block-wise PUT transfer. The client 102 and the server 104 communicate via a communications channel 106 as previously described with reference to FIG. 1A. However, in the embodiment of FIG. 1B, the conventional block-wise transfer involves the server 104 processing messages that include blocks of data from a large payload of a request as the messages are received. The conventional block-wise transfer allows for such processing to occur only for certain types of data (e.g., when a large number of bytes need to be stored at the server 104).

The conventional block-wise transfer begins when the client 102 sends a first message (shown by "CON [MID=1234], PUT, /options, 1:0/1/128") that includes a first block of data (not shown), such that the first message represents similar details as previously described with reference to FIG. 1A. In response to the server 104 receiving the first message, the server 104 begins to process the first block of data (shown by "process data"). After processing the first block of data, the server 104 sends a first response message (shown by "ACK [MID=1234], 2.04 Changed, 1:0/0/128") that indicates that data at the server 104 has been changed in response to the first message of the request.

After receiving the first response message, the client 102 sends a second message (shown by "CON [MID=1235], PUT, /options, 1:1/1/128") that includes a second block of data (not shown). In response to receiving the second message, the server 104 processes the second block of data (shown by "process data") and then sends a second response message (shown by "ACK [MID=1235], 2.04 Changed, 1:1/0/128"). After receiving the second response message, the client 102 sends a third message (shown by "CON [MID=1236], PUT, /options, 1:2/0/128") that includes a third block of data (not shown) and indicates that the client 102 has finished sending messages that include blocks of data from the request. In response to receiving the third message, the server 104 processes the third block of data (shown by "process data") and then sends a third response message (shown by "ACK [MID=1236], 2.04 Changed, 1:2/0/128").

Although the conventional block-wise transfers illustrated by FIG. 1A and FIG. 1B allow large payloads of a request to be transferred from a client to a server, such techniques do not split the large payload into logical blocks of data. As described herein, "logical data" or "logical blocks of data" may be described as data that has meaning in terms of structure and/or data that may be partially processed (e.g., processed as received) by a server. In an embodiment, if the large payload is a Concise Binary Object Representation (CBOR) stream, parts of a data item may be in one block of data and the rest of the data item may be in another block of data, making on-the-spot processing of the blocks difficult. As such, the server may need to keep a large buffer in its memory in order to recover the blocks of data from the large payload (e.g., as shown in FIG. 1A), or may only process the blocks of data as the blocks of data are received when the large payload includes certain types of information (e.g., as shown in FIG. 1B).

In some embodiments, a request that includes a large payload may be a CoAP Management Interface (CORECONF) request that includes Yet Another Next Generation (YANG) data. As described herein, CORECONF represents a network management interface for constrained devices and networks, and uses CoAP to access data stores and data node resources specified by YANG. Additionally, as described herein, YANG may be defined as a data modeling language for data sent using network management protocols, and as a modular language representing data structures in an Extensible Markup Language (XML) tree format. In an embodiment, CORECONF uses YANG-to-CBOR mapping to serialize data from a payload and converts YANG identifier strings to numeric identifiers for payload size reduction. As an example, CORECONF may implement CoAP techniques such as, for example, GET, FETCH, POST, PUT, iPATCH, and DELETE. Although CORECONF requests are also subject to the previously described issues, YANG data structures are capable of being split into logical blocks of data that may be more easily processed by a server.

In an embodiment, YANG data structures include a leaf node (sometimes referred to herein as a "leaf"), a leaf-list node (sometimes referred to herein as a "leaf-list"), a container node (sometimes referred to herein as a "container"), and a list node (sometimes referred to herein as a "list"). A leaf node contains simple data (e.g., an integer or a string), has one value of a particular type, and has no child nodes. A leaf-list node is a sequence of values of a particular type. A container node may be used to group related nodes in a subtree, such that the container node includes child nodes (and no value) and may contain any number of child nodes of any type (e.g., leafs, lists, containers, and leaf-lists). A list may define a sequence of list entries, such that each entry may represent a structure or a record instance and may be identified by values of its key leafs. Additionally, a list can define multiple keys and may contain any number of child nodes of any type (e.g., leafs, lists, containers, etc.). Examples of the YANG data structures are described in further detail with reference to FIG. 2.

Figure 2:
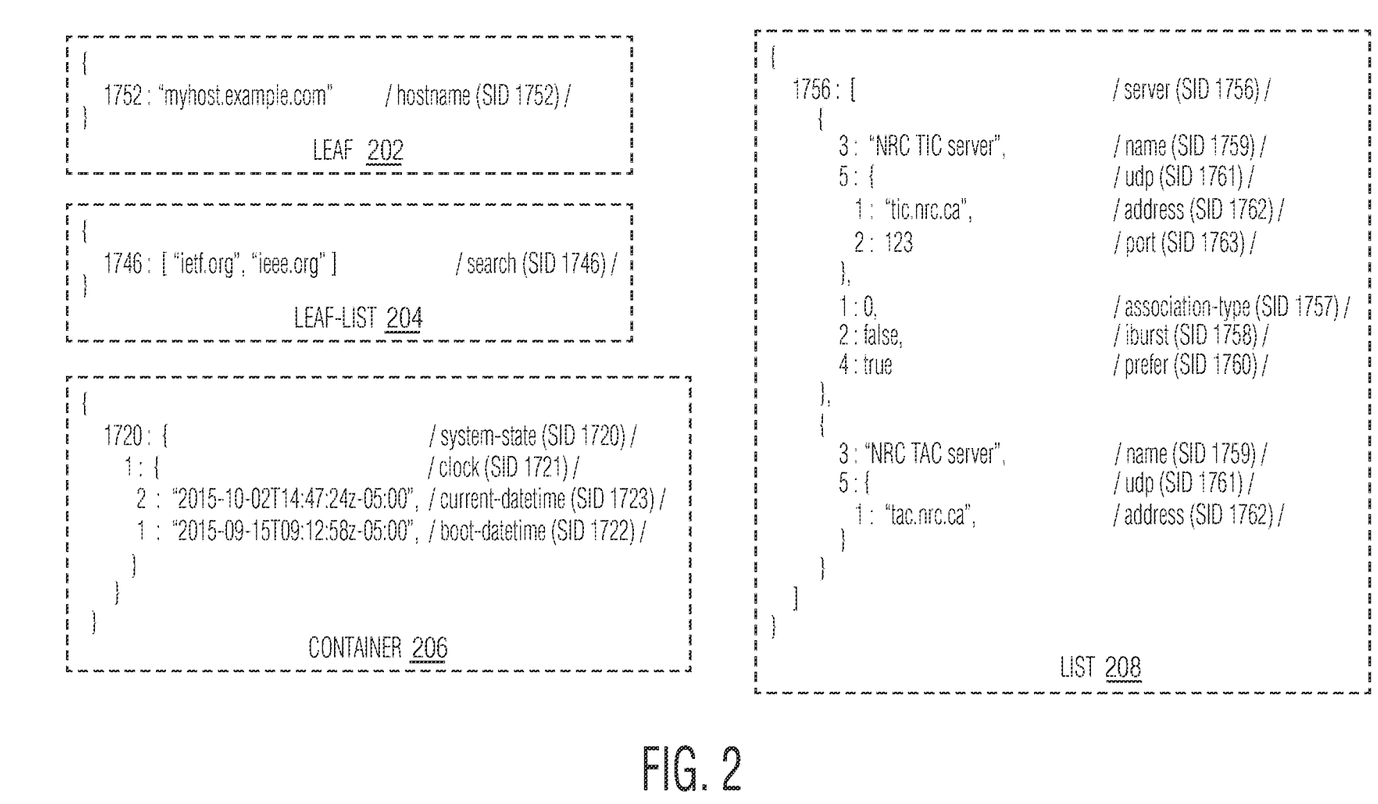
FIG. 2 depicts examples of Yet Another Next Generation (YANG) data structures.

FIG. 2 depicts examples of YANG data structures. In the embodiment of FIG. 2, the YANG data structures include an example of a leaf 202, an example of a leaf-list 204, an example of a container 206, and an example of a list 208. Although the YANG data structures are shown as including certain examples of data, the YANG data structures are not limited to including the data shown in FIG. 2.

In accordance with an embodiment of the invention, a technique for providing data involves splitting, by a device, data of a request into messages by splitting the data based on a node of the data, wherein the messages fit a supported size, and providing, by the device, the messages that include the data to a communications interface. As an example, the data may be YANG data and the messages may be described as logical messages, logical CORECONF messages, or CORECONF messages. In some embodiments, the technique may be implemented by a device (e.g., a client or a client device). For example, a device may include a processing system configured to split data of a request into messages by splitting the data based on a node of the data, wherein the messages fit a supported size, and provide the messages that include the data of the request to a communications interface. In an embodiment, the data is split into messages that include logical blocks of data (e.g., in terms of structure), such that a server may be able to process the messages that include the data as the messages are received. Therefore, splitting the data of the request into messages allows partial processing of the request at a server without the need for a large buffer and increases the overall efficiency of client-server communications.

In an embodiment, a splitting algorithm is applied to data (e.g., YANG data) of a request and includes splitting the data based on a node (e.g., leaf, leaf-list, container, or list). For example, the splitting algorithm includes entering the node of the data to obtain a node type, and splitting the node of the data according to the node type. In such an example, data of the request may be split into messages that fit a supported size. As described herein, a "supported size" may be defined as a message size that is no more than a maximum supported size (e.g., 16 bytes, 1024 bytes, etc.) of a server, and that may be indicated by the server prior to splitting the data. Examples of a supported size may include 16 bytes, 1024 bytes, etc. In an embodiment, the supported size may be indicated by the server prior to splitting the data through a message sent by the server to the client, such that the message may be sent by the server before the splitting algorithm is implemented by the client. Thus, the splitting algorithm includes splitting the node of the data to obtain a child node and determining whether the child node fits the supported size. If the child node fits the supported size, then the child node is included in one of the messages provided by the client. If the child node does not fit the supported size, then the child node is split, and the splitting algorithm is re-applied to the split child node. An example of the splitting algorithm is described in further detail with reference to FIG. 3.

Figure 3:
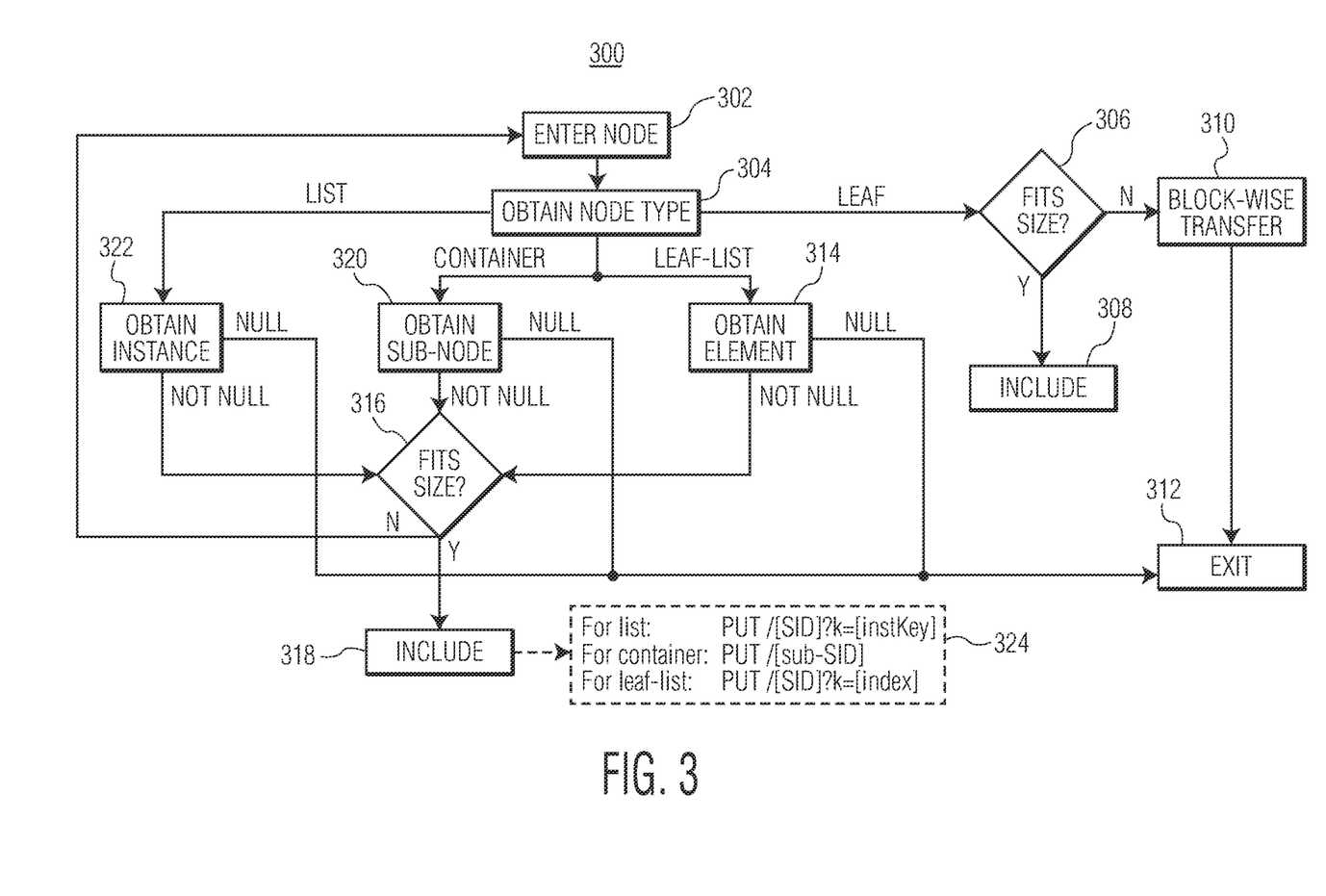
FIG. 3 illustrates an example of a splitting algorithm.

FIG. 3 illustrates an example of a splitting algorithm 300. In an embodiment, the splitting algorithm 300 may be implemented by a client (not shown). For example, the client may include a processor configured to split data (e.g., YANG data) of a request into messages according to the splitting algorithm 300. At block 302, the splitting algorithm 300 enters a node from the data of the request to obtain a node type at block 304. The node of the data is then split according to the node type.

When the node type is a leaf (e.g., leaf 202 shown in FIG. 2), the splitting algorithm 300 involves determining whether a value of the leaf fits a supported size at block 306. If the value of the leaf fits the supported size (shown by Y), then value is included in one of the messages provided by the client at block 308. If the value of the leaf does not fit the supported size (shown by N), then the value is provided by the client via a block-wise transfer at block 310, and then the client exits the splitting algorithm 300 at block 312.

When the node type is a leaf-list (e.g., leaf-list 204 shown in FIG. 2), the splitting algorithm 300 involves obtaining an element of the leaf-list at block 314. If the leaf-list is null, then the client exits the splitting algorithm 300 at block 312. If the element of the leaf-list is not null, then at block 316, it is determined whether the element fits the supported size. When the element does not fit the supported size (shown by N), the splitting algorithm 300 returns to block 302. When the element fits the supported size (shown by Y), the splitting algorithm 300 involves extracting an element index (index) from the element and including the element in one of the messages provided by the client at block 318. In an embodiment, the index is used in a request URI. As such, a message that includes the element of the leaf-list may be encoded as "PUT/[SID]?k=[index]" (shown in block 324), such that "SID" represents a Schema Item iDentifier (SID) of the leaf-list, and "k" represents a query parameter used to select a specific list instance.

When the node type is a container (e.g., container 206 shown in FIG. 2), the splitting algorithm 300 involves obtaining a sub-node of the container at block 320. If the container is null, then the client exits the splitting algorithm 300 at block 312. If the sub-node of the container is not null, then at block 316, it is determined whether the sub-node fits the supported size. When the sub-node does not fit the supported size (shown by N), the splitting algorithm 300 returns to block 302. When the sub-node fits the supported size (shown by Y), the splitting algorithm 300 involves extracting a sub-node SID (sub-SID) from the sub-node and including the sub-node in one of the messages provided by the client at block 318. In an embodiment, the sub-SID is used in a request URI. As such, a message that includes the sub-node of the container may be encoded as "PUT/[sub-SID]" (shown in block 324), such that "SID" represents an SID of the container, and "k" represents a query parameter used to select a specific list instance.

When the node type is a list (e.g., list 208 shown in FIG. 2), the splitting algorithm 300 involves obtaining an instance of the list at block 322. If the list is null, then the client exits the splitting algorithm 300 at block 312. If the instance of the list is not null, then at block 316, it is determined whether the instance fits the supported size. When the instance does not fit the supported size (shown by N), the splitting algorithm 300 returns to block 302. When the instance fits the supported size (shown by Y), the splitting algorithm 300 involves extracting a key instance (instKey) from the instance and including the instance in one of the messages provided by the client at block 318. In an embodiment, the instKey is used in a request URI. As such, a message that includes the instance of the list may be encoded as "PUT/[SID]?k=[instKey]" (shown in block 324), such that "SID" represents an SID of the list, and "k" represents a query parameter used to select a specific list instance.

In some embodiments, the number of messages that the data (e.g., YANG data) of the request is split into may be optimized for lists and containers. As an example, if a buffer prepared for sending is not empty, then instances of a list or sub-nodes of a container may be merged using an iPATCH request (if the instance or sub-node fits the supported size) so that the number of messages provided by the client are minimized. As such, the splitting algorithm may need to be further defined for lists and containers. Examples of splitting algorithms for lists and containers are described in further detail with reference to FIG. 4A and FIG. 4B.

Figure 4A:
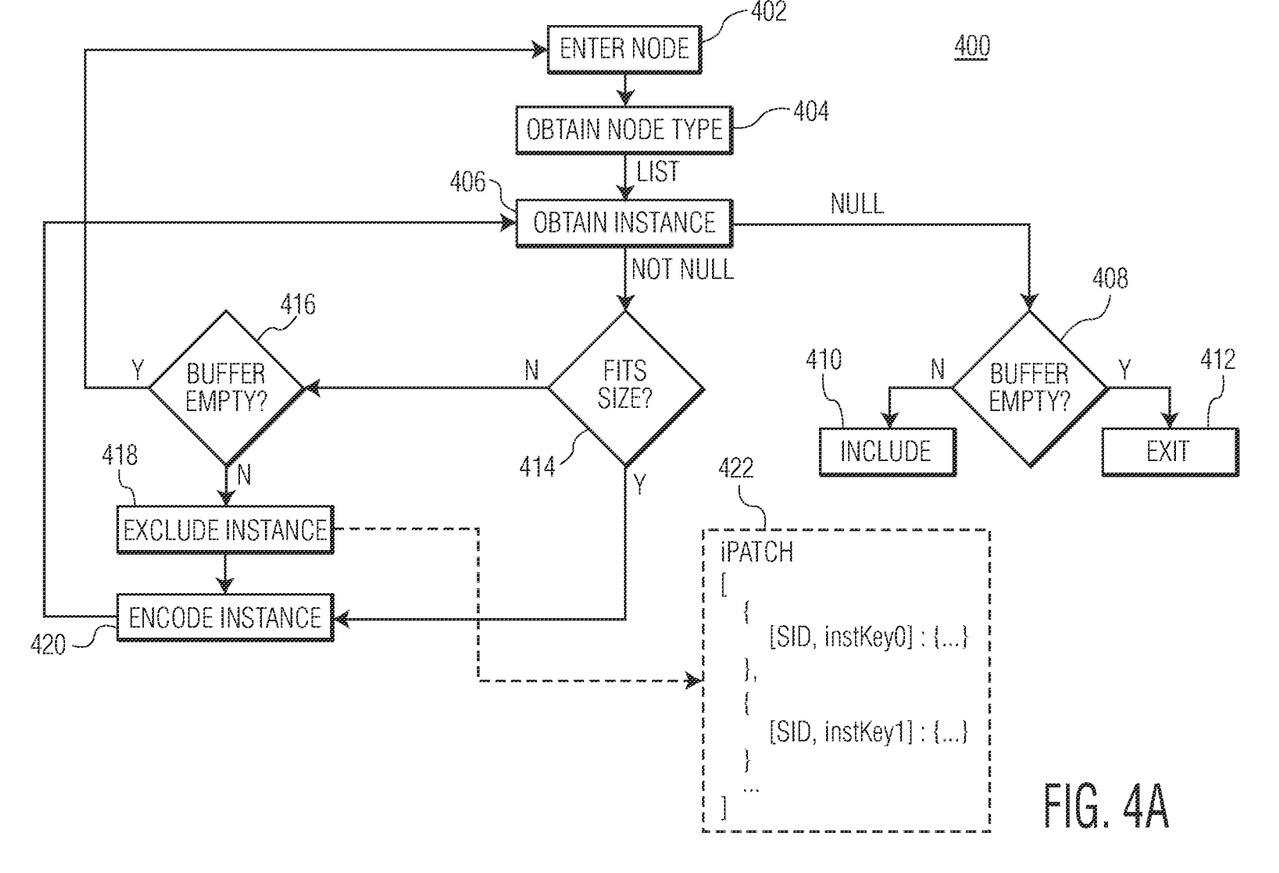
FIG. 4A illustrates an example of a splitting algorithm for optimizing lists.

FIG. 4A illustrates an example of a splitting algorithm 400 for optimizing lists. In an embodiment, the splitting algorithm 400 shown in FIG. 4A may be implemented by a client (not shown) to optimize instances of a list via an iPATCH request. At block 402, the splitting algorithm 400 enters a node from data (e.g., YANG data) of a request to obtain a node type at block 404. When the node type is a list (e.g., list 208 shown in FIG. 2), the splitting algorithm 400 involves obtaining an instance of the list at block 406.

When the obtained instance of the list is null (null instance), the splitting algorithm 400 involves determining whether a buffer prepared for sending is empty at block 408. If the buffer prepared for sending is not empty (shown by N), then the buffer prepared for sending is included in one of the messages sent by the client at block 410. If the buffer prepared for sending is empty (shown by Y), then the client exits the splitting algorithm 400 at block 412.

When the obtained instance of the list is not null, the splitting algorithm 400 involves determining whether the instance fits the supported size at block 414. If the instance fits the supported size (shown by Y), then the instance is encoded in a buffer of one of the messages with an SID of the node and an instKey (e.g., instKey[n], where "n" represents an integer no less than zero) of the instance at block 420, and then the splitting algorithm 400 obtains a next instance of the list by returning to block 406.

If the instance does not fit the supported size (shown by N), then the splitting algorithm 400 involves determining whether a buffer prepared for sending is empty at block 416. If it is determined that the instance does not fit the supported size and that the buffer prepared for sending is not empty (shown by N), then the buffer prepared for sending is sent in one of the messages and the instance is excluded from the message that includes the buffer prepared for sending at block 418, such that the message that excludes the instance may be encoded using the format shown by block 422. The splitting algorithm 400 then involves encoding the (excluded) instance in an empty buffer of another one of the messages with an SID of the node and an instKey of the instance at block 420, and obtaining a next instance of the list by returning to block 406. Alternatively, if it is determined that the instance does not fit the supported size and that the buffer prepared for sending is empty (shown by Y), then the splitting algorithm 400 involves returning to the step of entering the node of the data to further split the instance at block 402.

Figure 4B:
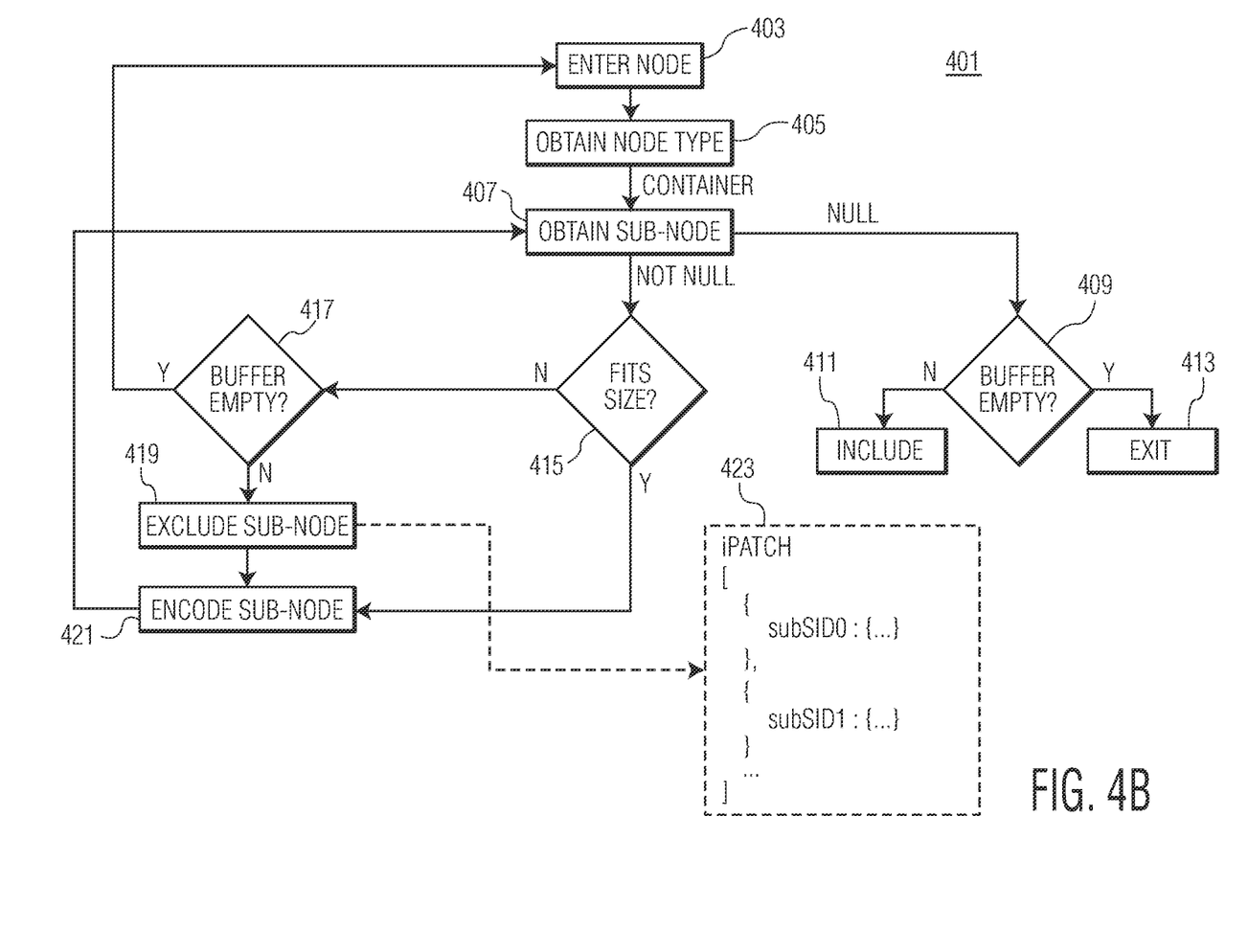
FIG. 4B illustrates an example of a splitting algorithm for optimizing containers.

FIG. 4B illustrates an example of a splitting algorithm 401 for optimizing containers. In an embodiment, the splitting algorithm 401 shown in FIG. 4B may be implemented by a client (not shown) to optimize sub-nodes of a container via an iPATCH request. At block 403, the splitting algorithm 401 enters a node from data (e.g., YANG data) of a request to obtain a node type at block 405. When the node type is a container (e.g., container 206 shown in FIG. 2), the splitting algorithm 401 involves obtaining a sub-node of the container at block 407.

When the obtained sub-node of the container is null (null sub-node), the splitting algorithm 401 involves determining whether a buffer prepared for sending is empty at block 409. If the buffer prepared for sending is not empty (shown by N), then the buffer prepared for sending is included in one of the messages sent by the client at block 411. If the buffer prepared for sending is empty (shown by Y), then the client exits the splitting algorithm 401 at block 413.

When the obtained sub-node of the container is not null, the splitting algorithm 401 involves determining whether the sub-node fits the supported size at block 415. If the sub-node fits the supported size (shown by Y), then the sub-node is encoded in a buffer of one of the messages with an SID of the sub-node (e.g., sub-SID[n], where "n" represents an integer no less than zero) at block 421, and then the splitting algorithm 401 obtains a next sub-node of the container by returning to block 407.

If the sub-node does not fit the supported size (shown by N), then the splitting algorithm 401 involves determining whether a buffer prepared for sending is empty at block 417. If it is determined that the sub-node does not fit the supported size and that the buffer prepared for sending is not empty (shown by N), then the buffer prepared for sending is sent in one of the messages and the sub-node is excluded from the message that includes the buffer prepared for sending at block 419, such that the message that excludes the sub-node may be encoded using the format shown by block 423. The splitting algorithm 401 then involves encoding the (excluded) sub-node in an empty buffer of another one of the messages with an SID of the sub-node at block 421, and obtaining a next sub-node of the container by returning to block 407. Alternatively, if it is determined that the sub-node does not fit the supported size and that the buffer prepared for sending is empty (shown by Y), then the splitting algorithm 401 involves returning to the step of entering the node of the data to further split the sub-node at block 403.

With reference to FIG. 3, FIG. 4A, and FIG. 4B, the splitting algorithms 300, 400, and/or 401 may be implemented by a client (e.g., device or client device) when communicating with a server in a client-server communication. As an example, the client-server communication may involve the client sending a large request (e.g., larger than supported by the server), and in response to the large request, the server sends a 4.00 Bad Request that indicates a maximum supported size of the server. In response to the 4.00 Bad Request, instead of sending the large request using a block-wise transfer (as specified by RFC7959), the client splits the request into messages that fit a supported size according to a splitting algorithm. In an embodiment, data of the request is split into messages according to the splitting algorithm, such that the data is split based on a node. The messages that include the data are sent to the server, and the server responds to the messages accordingly (e.g., responds with standard answers). In such an embodiment, the server includes a processor configured to obtain the messages that include the data and process the messages that include the data as the messages are received. Examples of client-server communications where a client implements a splitting algorithm are described in further detail with reference to FIGS. 5A-5C.

Figure 5A:
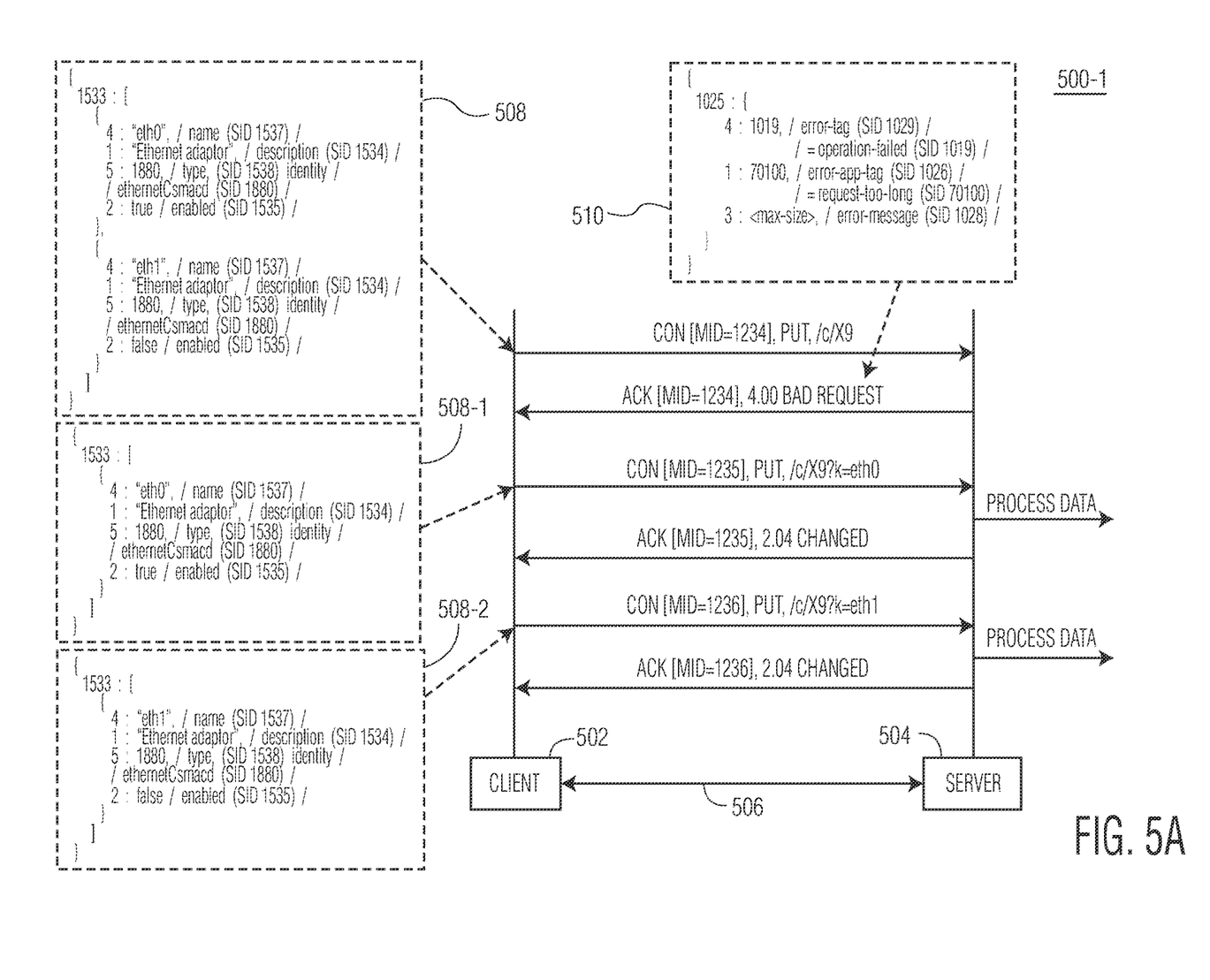
FIG. 5A illustrates an example of a client-server communication that implements the splitting algorithm of FIG. 3.

FIG. 5A illustrates an example of a client-server communication 500-1 that implements the splitting algorithm of FIG. 3. The client-server communication 500-1 involves a client 502 providing data (e.g., YANG data) to a server 504 and implementing the splitting algorithm 300 of FIG. 3. The client 502 and the server 504 communicate via a communications channel 506 as previously described with reference to FIG. 1A. In the embodiment of FIG. 5A, the client 502 provides a request that includes a large amount of data (e.g., a large list) to the server 504 by splitting the data into messages that include blocks of data from the large list of the request. Splitting of the data at the client 502 allows the server 504 to perform partial processing as the messages that include the data are received.

Initially, the client 502 attempts to send a request that includes data 508 to the server 504 in a first message (shown by "CON [MID=1234], PUT,/c/X9"). However, the first message is larger than a maximum supported size of the server 504 because the data 508 included in the first message includes a large list. As such, when the server 504 receives the first message, the server 504 sends a first response message (shown by "ACK [MID=1234], 4.00 Bad Request") that includes a block of data 510. As an example, the first response message may be a 4.00 Bad Request that indicates the maximum supported size of the server 504.

After receiving the 4.00 Bad Request, the client 502 splits the data 508 into messages according to the splitting algorithm 300 of FIG. 3. The client 502 then sends a second message (shown by "CON [MID=1235], PUT,/c/X9?k=eth0") that includes a first block of data 508-1 from the data 508 and that fits a supported size of the server 504. In response to receiving the second message, the server 504 processes the first block of data 508-1 (shown by "process data") and then sends a second response message (shown by "ACK [MID=1235], 2.04 Changed"). After receiving the second response message, the client 502 sends a third message (shown by "CON [MID=1236], PUT,/c/X9?k=eth1") that includes a second block of data 508-2 from the data 508 and that fits the supported size of the server 504. In response to receiving the third message, the server 504 processes the second block of data 508-2 (shown by "process data") and then sends a third response message (shown by "ACK [MID=1236], 2.04 Changed").

Figure 5B:
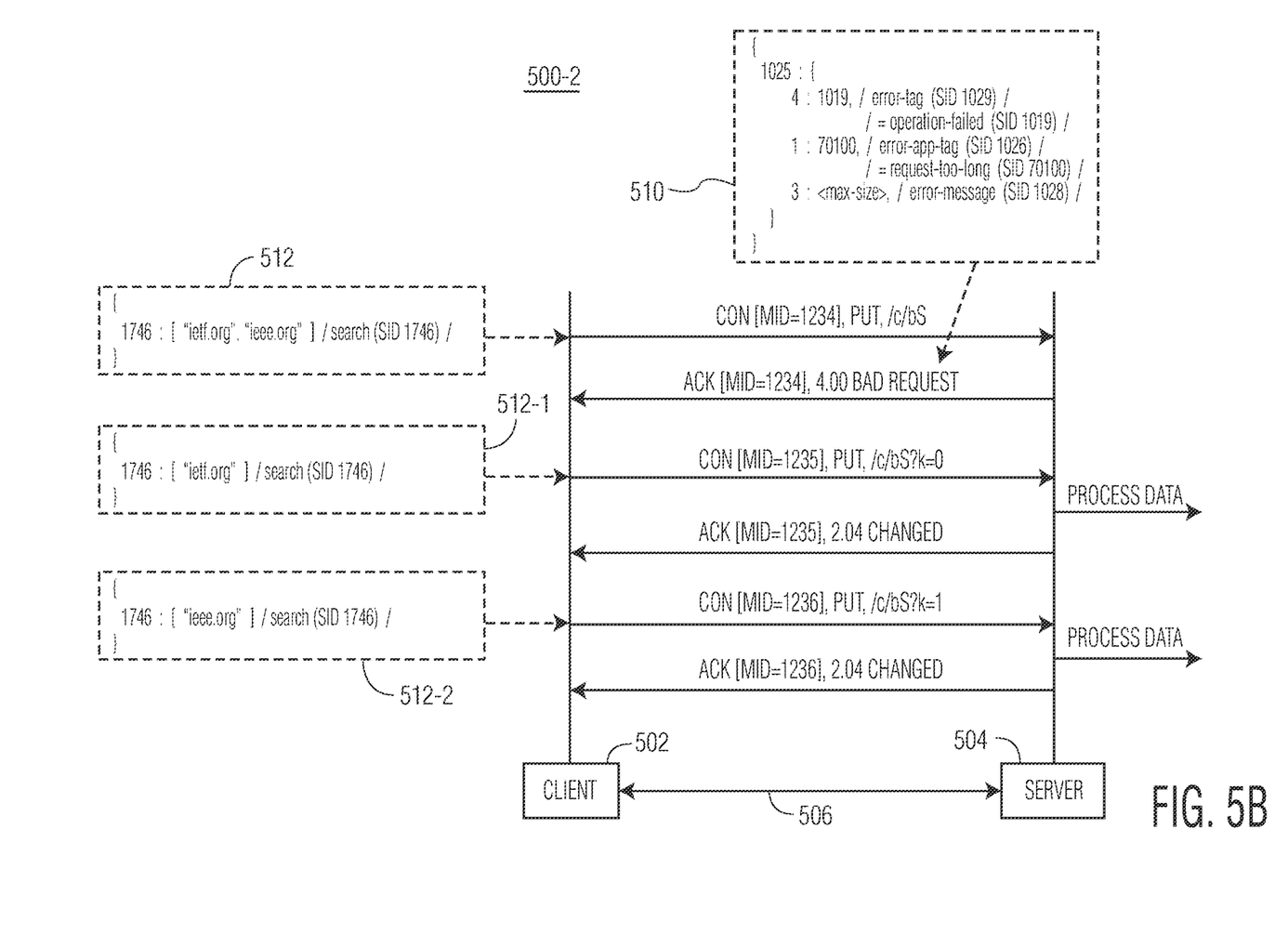
FIG. 5B illustrates another example of a client-server communication that implements the splitting algorithm of FIG. 3.

FIG. 5B illustrates another example of a client-server communication 500-2 that implements the splitting algorithm of FIG. 3. The client-server communication 500-2 involves a client 502 providing data (e.g., YANG data) to a server 504 and implementing the splitting algorithm 300 of FIG. 3. The client 502 and the server 504 communicate via a communications channel 506 as previously described with reference to FIG. 1A. In the embodiment of FIG. 5B, the client 502 provides a request that includes a large amount of data (e.g., a large leaf-list) to the server 504 similarly to as previously described with reference to FIG. 5A.

As shown, the client 502 sends a first message (shown by "CON [MID=1234], PUT, /c/bS") that is larger than a maximum supported size of the server 504 (e.g., because the data 512 included in the first message includes a large leaf-list), and in response, the server 504 sends a first response message (shown by "ACK [MID=1234], 4.00 Bad Request") that includes a block of data 510. The client 502 then sends a second message (shown by "CON [MID=1235], PUT, /c/bS?k=0") that includes a first block of data 512-1 from the data 512, and in response to receiving the second message, the server 504 processes the first block of data 512-1 (shown by "process data") and then sends a second response message (shown by "ACK [MID=1235], 2.04 Changed"). The client 502 then sends a third message (shown by "CON [MID=1236], PUT, /c/bS?k=1") that includes a second block of data 512-2 from the data 512, and in response to receiving the third message, the server 504 processes the second block of data 512-2 (shown by "process data") and then sends a third response message (shown by "ACK [MID=1236], 2.04 Changed").

Figure 5C:
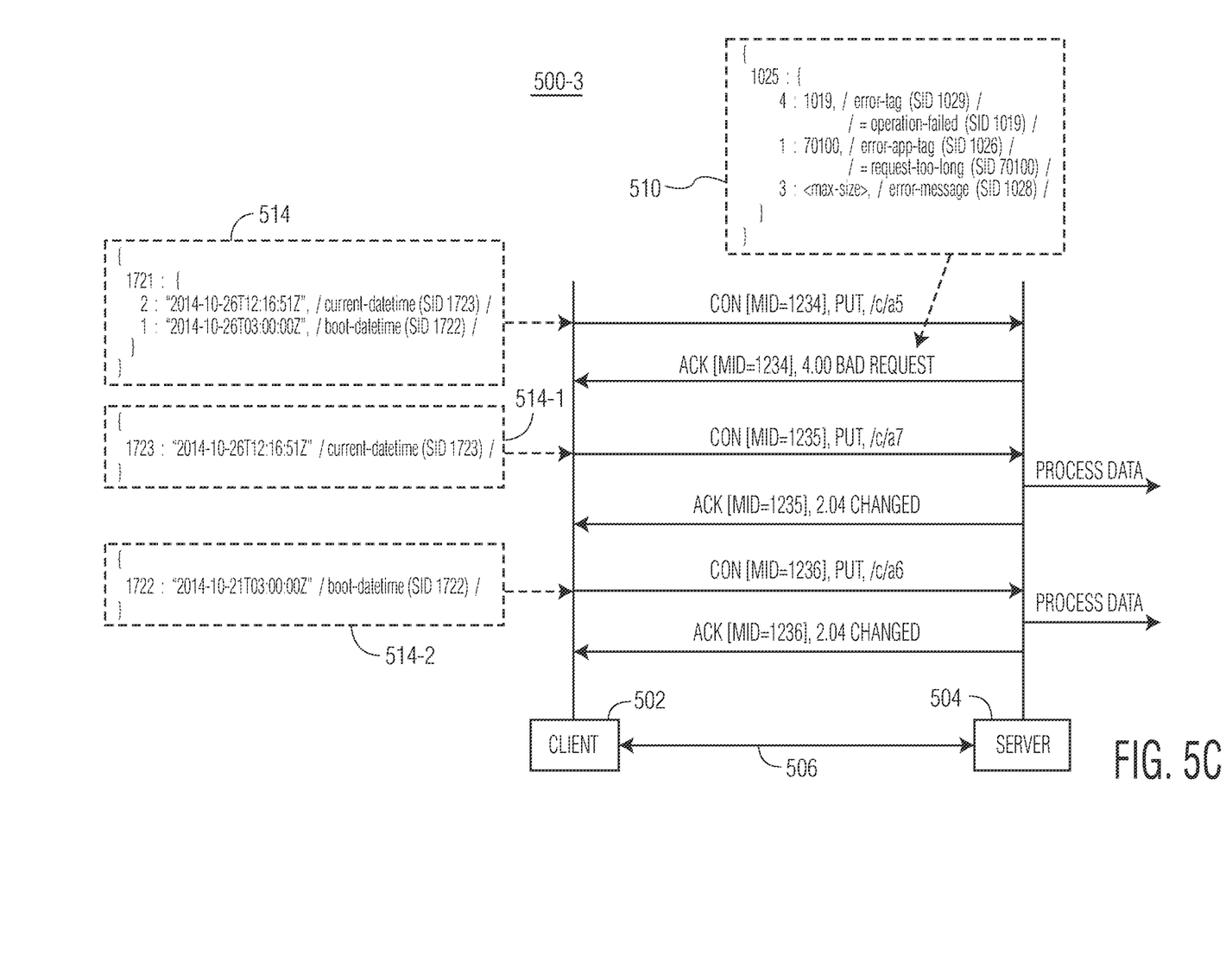
FIG. 5C illustrates another example of a client-server communication that implements the splitting algorithm of FIG. 3.

FIG. 5C illustrates another example of a client-server communication 500-3 that implements the splitting algorithm of FIG. 3. The client-server communication 500-3 involves a client 502 providing data (e.g., YANG data) to a server 504 and implementing the splitting algorithm 300 of FIG. 3. The client 502 and the server 504 communicate via a communications channel 506 as previously described with reference to FIG. 1A. In the embodiment of FIG. 5C, the client 502 provides a request that includes a large amount of data (e.g., a large container) to the server 504 similarly to as previously described with reference to FIG. 5A.

As shown, the client 502 sends a first message (shown by "CON [MID=1234], PUT, /c/a5") that is larger than a maximum supported size of the server 504 (e.g., because the data 514 included in the first message includes a large container), and in response, the server 504 sends a first response message (shown by "ACK [MID=1234], 4.00 Bad Request") that includes a block of data 510. The client 502 then sends a second message (shown by "CON [MID=1235], PUT, /c/a7") that includes a first block of data 514-1 from the data 514, and in response to receiving the second message, the server 504 processes the first block of data 514-1 (shown by "process data") and then sends a second response message (shown by "ACK [MID=1235], 2.04 Changed"). The client 502 then sends a third message (shown by "CON [MID=1236], PUT, /c/a6") that includes a second block of data 514-2 from the data 514, and in response to receiving the third message, the server 504 processes the second block of data 514-2 (shown by "process data") and then sends a third response message (shown by "ACK [MID=1236], 2.04 Changed").

Figure 6:
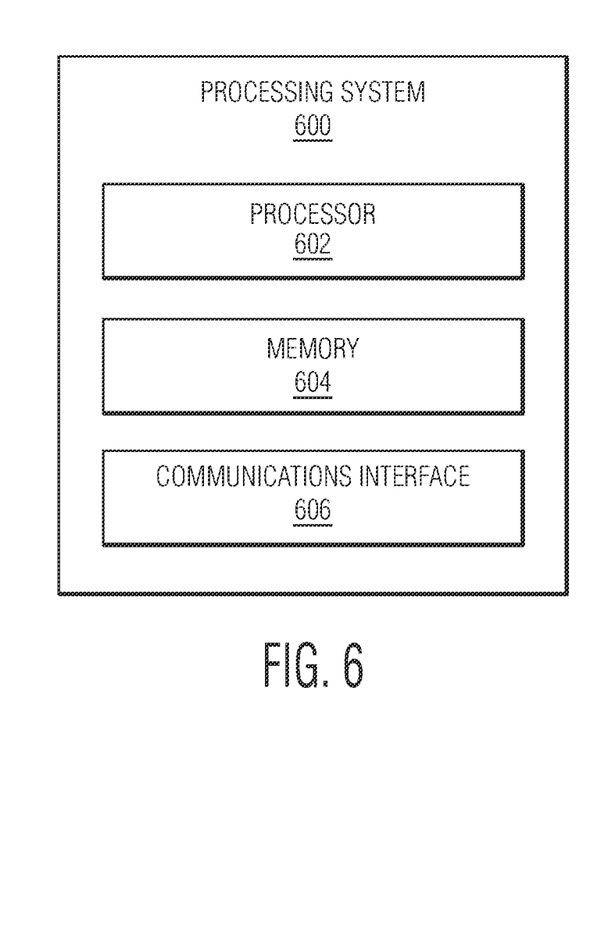
FIG. 6 depicts a processing system that includes a processor, memory, and a communications interface.

In an embodiment, the above-described functionality is performed at least in part by a computer or computers which include a processing system and execute computer readable instructions. FIG. 6 depicts a processing system 600 that includes a processor 602, a memory 604, and a communications interface 606. The processor 602 may include a multifunction processor and/or an application-specific processor. Additionally, the processor 602 may include multiple cores with different types of cores and peripheral circuitry. In an embodiment, the processor 602 splits data (e.g., YANG data) into messages according to a splitting algorithm (e.g., splitting algorithm 300 shown in FIG. 3). The memory 604 within the processing system 600 may include, for example, storage medium such as read only memory (ROM), flash memory, RAM, and a large capacity permanent storage device such as a hard disk drive. In an embodiment, the data that is split by the processor 602 is stored in the memory 604. The communications interface 606 enables communications with other computers via, for example, the Internet Protocol (IP). In an embodiment, the communications interface 606 sends (e.g., transmits) the messages that include the data. As an example, the processing system 600 is included in a computer and executes computer readable instructions stored in the storage medium to implement various tasks as described above.

Figure 7:
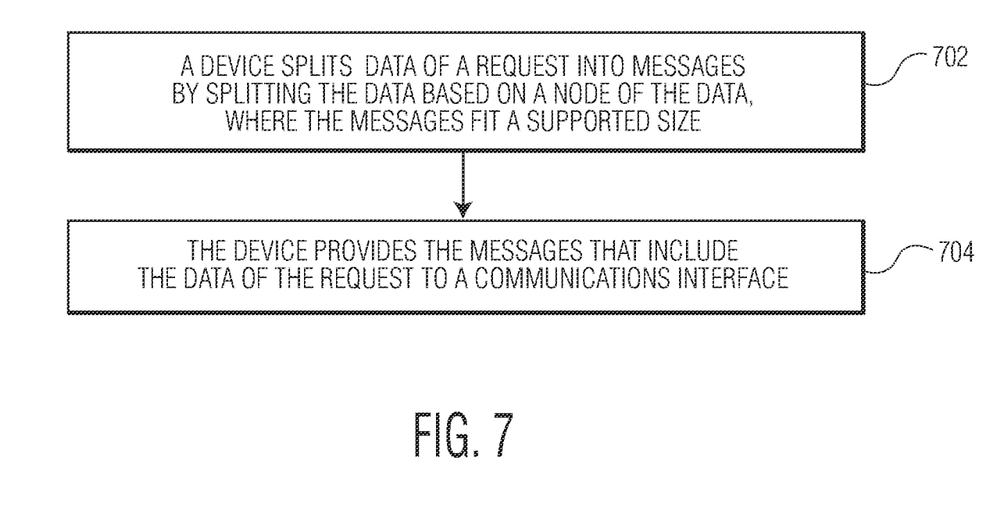
FIG. 7 illustrates a flow diagram of a technique for providing data in accordance with an embodiment of the invention.

FIG. 7 illustrates a flow diagram of a technique for providing data in accordance with an embodiment of the invention. At block 702, a device splits data of a request into messages by splitting the data based on a node of the data, where the messages fit a supported size. At block 704, the device provides the messages that include the data of the request to a communications interface.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention may be implemented entirely in hardware or in an implementation containing both hardware and software elements. In embodiments which use software, the software may include but is not limited to firmware, resident software, microcode, etc. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of providing data, the method comprising:
splitting, by a device, data of a request into messages by splitting the data based on a node of the data, wherein the messages fit a supported size; and
providing, by the device, the messages that include the data to a communications interface;
wherein splitting the data includes:
entering the node of the data to obtain a node type; and
splitting the node of the data according to the node type.

2. A device comprising:
a processing system configured to:
split data of a request into messages by splitting the data based on a node of the data, wherein the messages fit a supported size; and
provide the messages that include the data of the request to a communications interface;
wherein the processing system is configured to split the data by:
entering the node of the data to obtain a node type; and
splitting the node of the data according to the node type.

3. The device of claim 2, wherein the processing system is configured to split the data in response to the device receiving a response message that indicates a maximum supported size.

4. The device of claim 2, wherein the node type is a leaf, and wherein the processing system is configured to split the data according to the node type by:
determining that a value of the leaf fits the supported size; and
including the value in one of the messages.

5. The device of claim 2, wherein the node type is a leaf, and wherein the processing system is configured to split the data according to the node type by:
determining that a value of the leaf does not fit the supported size; and
providing the value via a block-wise transfer.

6. The device of claim 2, wherein the node type is a leaf-list, and wherein the processing system is configured to split the data according to the node type by:
obtaining an element of the leaf-list;
determining whether the element fits the supported size;
extracting an element index (index) from the element; and
including the element in one of the messages, wherein the index is used in a request Uniform Resource Identifier (URI).

7. The device of claim 2, wherein the node type is a list, and wherein the processing system is configured to split the data according to the node type by:
obtaining an instance of the list;
determining whether the instance fits the supported size;
extracting a key instance (instKey) from the instance; and
including the instance in one of the messages, wherein the instKey is used in a request URI.

8. The device of claim 7, wherein determining whether the instance fits the supported size includes:
determining that the instance fits the supported size;
encoding the instance in a buffer of one of the messages with a Schema Item iDentifier (SID) of the node and the instKey of the instance; and
obtaining a next instance of the list.

9. The device of claim 7, wherein determining whether the instance fits the supported size includes:
determining that the instance does not fit the supported size and that a buffer prepared for sending is not empty;
sending the buffer prepared for sending in one of the messages, wherein the instance is excluded from the message that includes the buffer prepared for sending;
encoding the instance in an empty buffer of another one of the messages with an SID of the node and the instKey of the instance; and
obtaining a next instance of the list.

10. The device of claim 7, wherein determining whether the instance fits the supported size includes:
determining that the instance does not fit the supported size and that a buffer prepared for sending is empty; and
returning to the step of entering the node of the data to further split the instance.

11. The device of claim 2, wherein the node type is a list, and wherein the processing system is configured to split the data according to the node type by:
obtaining an instance of the list that is null (null instance);
determining that a buffer prepared for sending is not empty; and
sending the buffer prepared for sending in one of the messages.

12. The device of claim 2, wherein the node type is a container, and wherein the processing system is configured to split the data according to the node type by:
  obtaining a sub-node of the container;
  determining whether the sub-node fits the supported size;
  extracting a sub-node SID (sub-SID) from the sub-node; and
  including the sub-node in one of the messages, wherein the sub-SID is used in a request URI.

13. The device of claim 12, wherein determining whether the sub-node fits the supported size includes:
  determining that the sub-node fits the supported size;
  encoding the sub-node in a buffer of one of the messages with an SID of the sub-node; and
  obtaining a next sub-node of the container.

14. The device of claim 12, wherein determining whether the sub-node fits the supported size includes:
  determining that the sub-node does not fit the supported size and that a buffer prepared for sending is not empty;
  sending the buffer prepared for sending in one of the messages, wherein the sub-node is excluded from the message that includes the buffer prepared for sending;
  encoding the sub-node in an empty buffer of another one of the messages with an SID of the sub-node; and
  obtaining a next sub-node of the container.

15. The device of claim 12, wherein determining whether the sub-node fits the supported size includes:
  determining that the sub-node does not fit the supported size and that a buffer prepared for sending is empty; and
  returning to the step of entering the node of the data to further split the sub-node.

16. The device of claim 2, wherein the node type is a container, and wherein the processing system is configured to split the data according to the node type by:
  obtaining a sub-node of the container that is null (null sub-node);
  determining that a buffer prepared for sending is not empty; and
  sending the buffer prepared for sending in one of the messages.

17. The device of claim 2, wherein the splitting includes:
  splitting the node of the data to obtain a child node;
  determining that the child node fits the supported size; and
  including the child node in one of the messages.

18. The device of claim 2, wherein the splitting includes:
  splitting the node of the data to obtain a child node;
  determining that the child node does not fit the supported size; and
  splitting the child node.

* * * * *